(12) United States Patent
Jalali

(10) Patent No.: US 7,852,746 B2
(45) Date of Patent: Dec. 14, 2010

(54) TRANSMISSION OF SIGNALING IN AN OFDM-BASED SYSTEM

(75) Inventor: Ahmad Jalali, Rancho Santa Fe, CA (US)

(73) Assignee: Qualcomm Incorporated, San Diego, CA (US)

( * ) Notice: Subject to any disclaimer, the term of this patent is extended or adjusted under 35 U.S.C. 154(b) by 1466 days.

(21) Appl. No.: 10/944,146

(22) Filed: Sep. 16, 2004

(65) Prior Publication Data

US 2006/0045001 A1 Mar. 2, 2006

Related U.S. Application Data

(60) Provisional application No. 60/604,660, filed on Aug. 25, 2004.

(51) Int. Cl.
*H04J 11/00* (2006.01)
(52) U.S. Cl. .................. 370/208; 370/329; 455/102
(58) Field of Classification Search ......... 370/208–210, 370/329, 341, 348; 455/101, 102, 105
See application file for complete search history.

(56) References Cited

U.S. PATENT DOCUMENTS

| | | | | |
|---|---|---|---|---|
| 5,623,485 | A * | 4/1997 | Bi ........................ | 370/209 |
| 6,091,716 | A * | 7/2000 | Gorday et al. ............ | 370/314 |
| 6,285,655 | B1 * | 9/2001 | Lundby et al. ............ | 370/209 |
| 6,366,779 | B1 * | 4/2002 | Bender et al. ............ | 455/450 |
| 6,393,077 | B1 * | 5/2002 | Usui ....................... | 375/343 |
| 6,556,639 | B1 * | 4/2003 | Goldston et al. ......... | 375/365 |
| 6,928,062 | B2 * | 8/2005 | Krishnan et al. ......... | 370/329 |
| 7,242,958 | B2 * | 7/2007 | Chung et al. ............. | 455/522 |
| 7,372,909 | B2 * | 5/2008 | Miyoshi .................. | 375/260 |

(Continued)

FOREIGN PATENT DOCUMENTS

DE 3644175 7/1988

(Continued)

OTHER PUBLICATIONS

Patent Cooperation Treaty, "International Search Report and Written Opinion", dated Jan. 18, 2006, Issued over corresponding PCT Application No. PCT/US2005/030229, 15 pages.

(Continued)

*Primary Examiner*—William Trost, IV
*Assistant Examiner*—Roberta A Shand
(74) *Attorney, Agent, or Firm*—Turocy & Watson, LLP

(57) ABSTRACT

Techniques for efficiently transmitting various types of signaling on the forward and reverse links in an OFDM-based system are described. Instead of specifically allocating subbands to individual signaling channels, signaling data for a signaling channel on a given link is sent as "underlay" to other transmissions that may be sent on the same link. Each wireless terminal is assigned a different PN code. The signaling data for each terminal is spectrally spread over all or a portion of the system bandwidth using the assigned PN code. For the reverse link, a wireless terminal may transmit signaling on all N usable subbands and may transmit traffic data on L subbands assigned for data transmission, which may be a subset of the N usable subbands. For the forward link, a base station may transmit signaling and traffic data for all terminals on the N usable subbands.

52 Claims, 10 Drawing Sheets

U.S. PATENT DOCUMENTS

| | | | |
|---|---|---|---|
| 7,447,517 B2 * | 11/2008 | Roy et al. | 455/522 |
| 7,551,546 B2 * | 6/2009 | Ma et al. | 370/208 |
| 7,660,275 B2 * | 2/2010 | Vijayan et al. | 370/312 |
| 2002/0086707 A1 * | 7/2002 | Struhsaker et al. | 455/561 |
| 2005/0009476 A1 * | 1/2005 | Wu et al. | 455/101 |
| 2005/0030886 A1 * | 2/2005 | Wu et al. | 370/206 |
| 2005/0096061 A1 * | 5/2005 | Ji et al. | 455/450 |
| 2005/0185725 A1 | 8/2005 | Maeda et al. | |
| 2005/0271012 A1 * | 12/2005 | Agrawal et al. | 370/331 |
| 2006/0018347 A1 * | 1/2006 | Agrawal | 370/537 |
| 2006/0135171 A1 * | 6/2006 | Roy et al. | 455/450 |
| 2006/0171416 A1 * | 8/2006 | Seidel et al. | 370/473 |

FOREIGN PATENT DOCUMENTS

| | | |
|---|---|---|
| EP | 1 179 902 A1 | 3/2001 |
| EP | 1 435 750 A1 | 12/2003 |
| EP | 1435750 | 7/2004 |
| EP | 1 560 359 A1 | 1/2005 |
| JP | 2001268044 | 9/2001 |
| JP | 2003-309533 A | 10/2003 |
| JP | 2003309533 | 10/2003 |
| JP | 2005244960 | 9/2005 |
| WO | WO 97/38501 | 10/1997 |

OTHER PUBLICATIONS

Kishiyama et al, "Experiments on throughput performance above 100Mbps in forward link for VSF-OFCDM broadband wireless access", 2003, pp. 1863-1868.

Bahai et al, "Multi-carrier Digital Communications Theory and Applications of OFDM", Jan. 1, 1999, p. 210-213.

Office Action mailed Aug. 6, 2008 for Chilean Patent Application No. 2159-2005, 6 pages.

Office Action mailed Jan. 25, 2008 for European Patent Application No. 05791214.9, 2 pages.

Office Action mailed Oct. 14, 2009 for European Patent Application No. 05791214.9, 6 pages.

Office Action mailed Aug. 20, 2008 for Malaysian Patent Application No. PI 20053977, 2 pages.

Translated Japanese Office Action dated Dec. 24, 2009, mailed Apr. 7, 2010, for Japanese Application Serial No. 2007-530118, 4 pages.

Canadian Office Action dated Feb. 24, 2010 for Canadian Patent Application Serial No. 2,585,239, 3 pages.

Kishiyama, et al., "Experiments on throughput performance above 100-Mbps in forward link for VSF-OFCDM broadband wireless access", Vehicular Technology Conference, 2003. VTC 2003-Fall. 2003 IEEE 58th, Oct. 6, 2003, pp. 1863-1868.

* cited by examiner

TRANSMISSION OF SIGNALING IN AN OFDM-BASED SYSTEM

This application claims the benefit of provisional U.S. Application Ser. No. 60/604,660 entitled "Transmitting Physical Layer Signaling as Underlay in OFDMA Systems," filed Aug. 25, 2004.

BACKGROUND

I. Field

The present invention relates generally to communication, and more specifically to transmission of signaling in a wireless communication system.

II. Background

A multiple-access system can concurrently support communication for multiple terminals on the forward and reverse links. The forward link (or downlink) refers to the communication link from the base stations to the terminals, and the reverse link (or uplink) refers to the communication link from the terminals to the base stations. An orthogonal frequency division multiple access (OFDMA) system is a multiple-access system that utilizes orthogonal frequency division multiplexing (OFDM). OFDM is a multi-carrier modulation technique that effectively partitions the overall system bandwidth into multiple (N) orthogonal frequency subbands. These subbands are also referred to as tones, sub-carriers, bins, frequency channels, and so on. Each subband is associated with a respective sub-carrier that may be modulated with data. The OFDMA system may assign a different set of subbands to each terminal, and data for the terminal may be sent on the assigned subbands. By using non-overlapping subband sets for different terminals, interference among the terminals may be avoided, and improved performance may be achieved.

Various signaling channels are typically used by a physical layer to support data transmission on the forward and reverse links. These signaling channels may carry requests for certain information, the requested information, acknowledgments (ACKs), and so on. Some subbands may be set aside on each link and used for the signaling channels for that link. However, dedicating subbands specifically for the signaling channels may represent inefficient use of the available subbands since the signaling channels may be intermittently active and may carry only a small amount of data when active. Each subband that is dedicated for the signaling channels represents one less subband that may be used for data transmission.

There is therefore a need in the art for techniques to more efficiently transmit signaling in an OFDMA system.

SUMMARY

Techniques for efficiently transmitting various types of signaling on the forward and reverse links in an OFDM-based system are described herein. Instead of specifically allocating subbands to individual signaling channels, signaling data for a given signaling channel on a given (forward or reverse) link may be sent as "underlay" to other transmissions that may be sent on the same link. Each wireless terminal may be assigned a different pseudo-random number (PN) code or sequence. The signaling data for each terminal may be spectrally spread over all or a portion of the system bandwidth using the PN code assigned to the terminal. The processing gain from the spreading allows the signaling data to be sent at a low power level so that the signaling may only marginally impact the performance of the other transmissions being sent concurrently.

In an embodiment, a transmitting entity (which may be a base station or a wireless terminal) includes a signaling modulator, a data modulator, and a combiner. The signaling modulator spectrally spreads signaling data over M subbands and generates signaling chips. The M subbands may be all or a subset of N subbands usable for transmission. The signaling modulator may multiply the signaling data with a PN sequence and directly generate the signaling chips. Alternatively, the signaling modulator may multiply the signaling data with the PN sequence to obtain spread signaling data, map the spread signaling data onto the M subbands, and perform OFDM modulation on the mapped and spread signaling data to generate the signaling chips. The data modulator maps data symbols onto L subbands used for data transmission, where $1 < L \leq N$, and further performs OFDM modulation on the mapped data symbols to generate data chips. The combiner combines (e.g., scales and sums) the signaling chips with the data chip and generates output chips.

For the reverse link, a wireless terminal may transmit signaling on all N usable subbands and may transmit traffic/packet data on the L subbands assigned to the terminal for data transmission, which may be a subset of the N usable subbands. For the forward link, a base station may transmit signaling and traffic data for all terminals on the N usable subbands. Signaling and traffic data may also be transmitted in other manners on the forward and reverse links, as described below. Various types of signaling may be sent in the manner described herein.

A receiving entity performs the complementary processing to recover the transmitted signaling and traffic data. Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
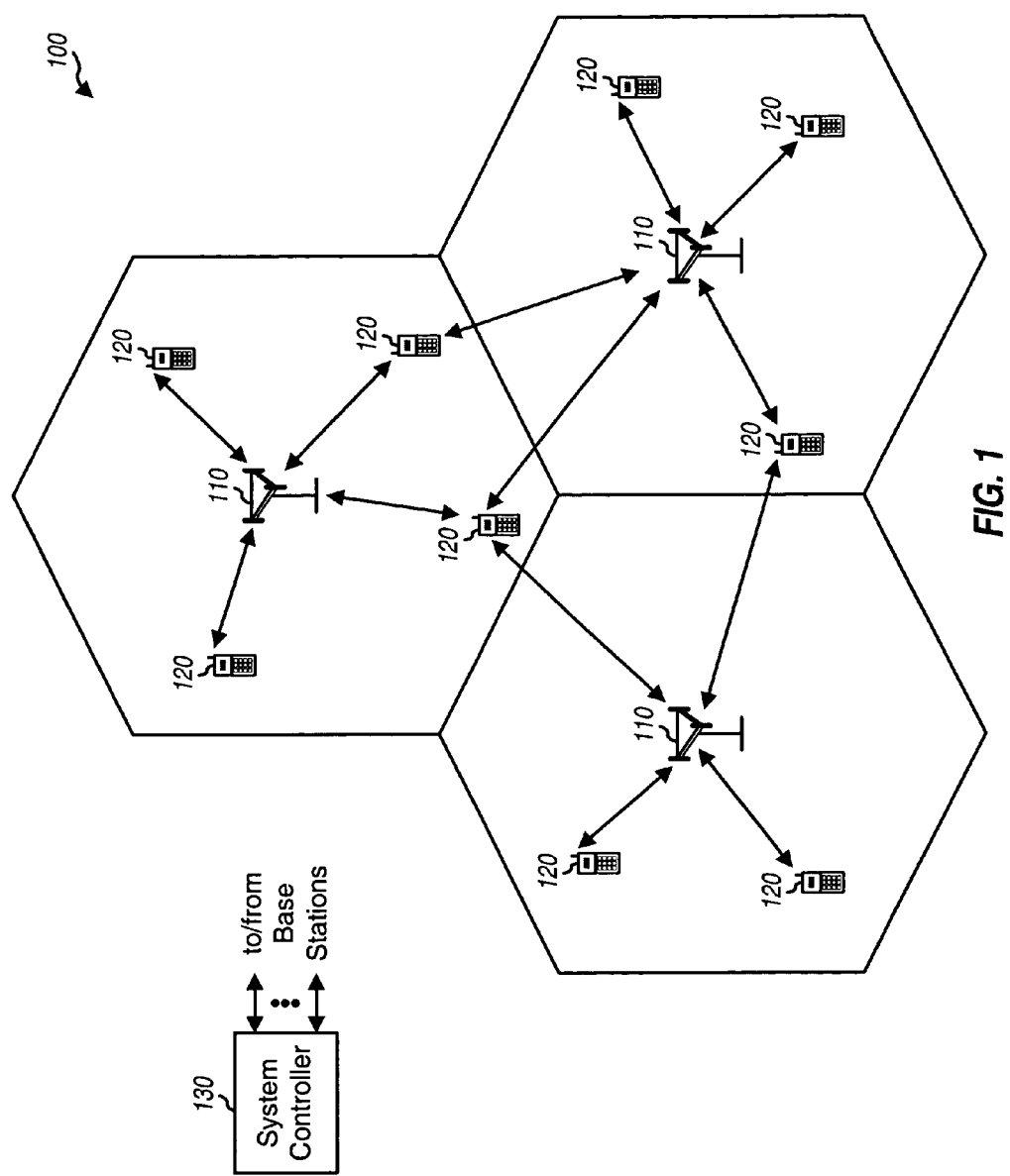
FIG. 1 shows an OFDMA system with base stations and wireless terminals.

FIG. 1 shows an exemplary OFDMA system 100 with a number of base stations 110 that support communication for a number of wireless terminals 120. A base station is a fixed station used for communicating with the terminals and may also be called an access point, a Node B, or some other terminology. Terminals 120 are typically dispersed throughout the system, and each terminal may be fixed or mobile. A terminal may also be called a mobile station, a user equipment (UE), a wireless communication device, or some other terminology. Each terminal may communicate with one or possibly multiple base stations on the forward and reverse links at any given moment. A system controller 130 provides coordination and control for base stations 110 and further controls routing of data for the terminals served by these base stations.

Each base station 110 provides communication coverage for a respective geographic area. A base station and/or its coverage area may be referred to as a "cell", depending on the context in which the term is used. To increase capacity, the coverage area of each base station may be partitioned into multiple (e.g., three) sectors. Each sector is served by a base transceiver subsystem (BTS). For a sectorized cell, the base station for that cell typically includes the BTSs for all sectors of that cell. For simplicity, in the following description, the term "base station" is used generically for both a fixed station that serves a cell and a fixed station that serves a sector. The terms "user" and "terminal" are also used interchangeably herein.

The OFDMA system has N total subbands, which are created by OFDM. All or a subset of the N total subbands may be used to transmit traffic data, pilot, and signaling. Typically, some subbands are not used for transmission and serve as guard subbands to allow the system to meet spectral mask requirements. For simplicity, the following description assumes that all N total subbands are usable for transmission, i.e., there are no guard subbands.

Figure 2:
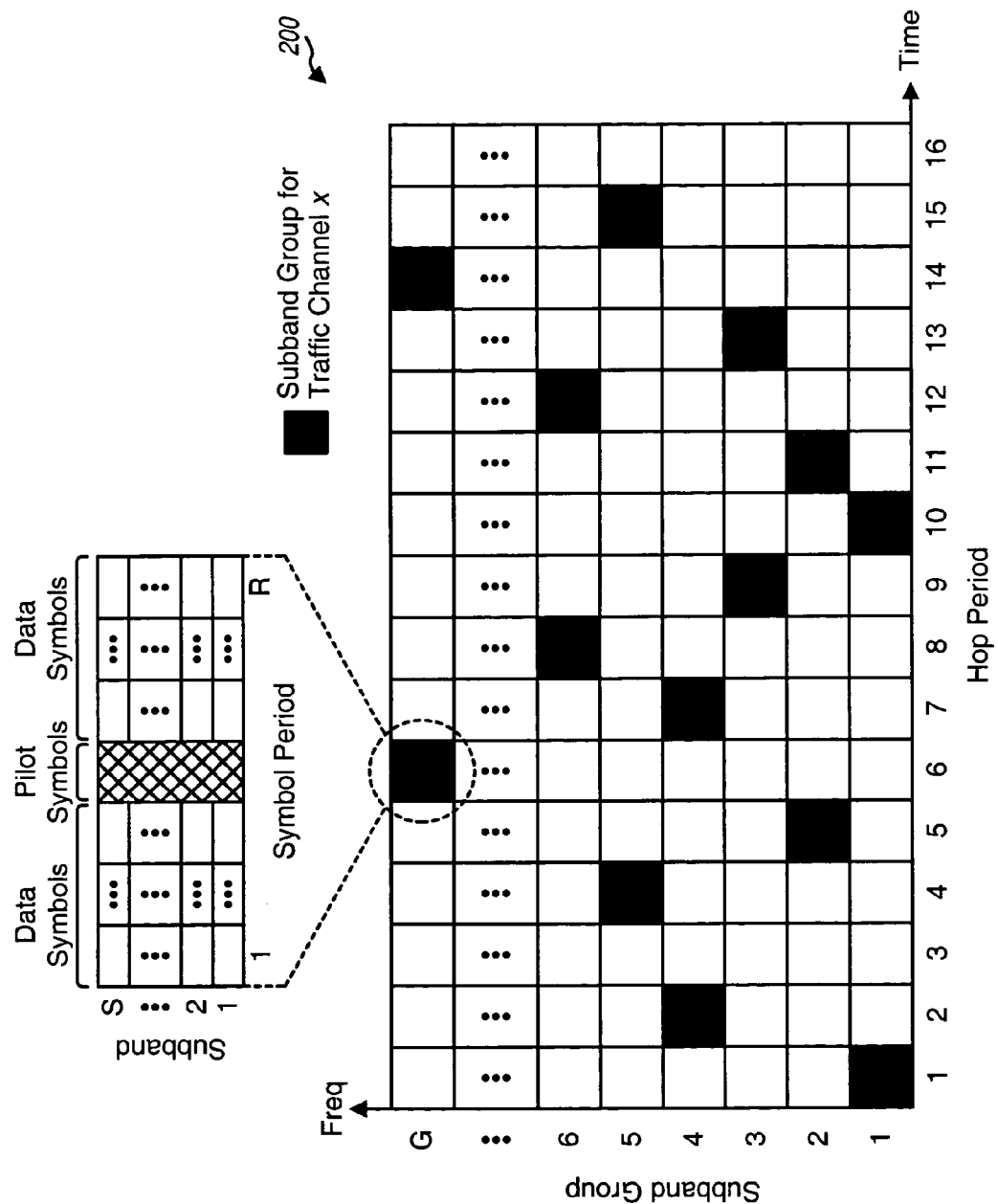
FIG. 2 illustrates a frequency hopping (FH) scheme.

FIG. 2 illustrates a frequency hopping (FH) scheme 200 that may be used for the forward and/or reverse link in the OFDMA system. Frequency hopping can provide frequency diversity against deleterious path effects and randomization of interference from other cells/sectors. With frequency hopping, each terminal is assigned a traffic channel that is associated with an FH sequence that indicates a specific group of one or more subbands to use in each "hop" period. The FH sequence may also be called a hop pattern or some other terminology. A hop period is the amount of time spent on a given subband group and spans R OFDM symbol periods (or simply, "symbol period"), where R≧1. The FH sequence may pseudo-randomly select different subband groups in different hop periods. Frequency diversity is achieved by selecting all or many of the N usable subbands over some number of hop periods.

For the embodiment shown in FIG. 2, the N usable subbands are arranged into G groups. Each group contains S subbands, where in general G>1, S≧1, and G·S≦N. The subbands in each group may be contiguous (as shown in FIG. 2) or non-contiguous (e.g., distributed across the N usable subbands). Each terminal may be assigned one group of S subbands in each hop period. Pilot symbols may be time division multiplexed (TDM) with data symbols (as shown in FIG. 2), frequency division multiplexed (FDM) with data symbols (not shown in FIG. 2), or sent in some other manner. As used herein, a "data" symbol is a modulation symbol for traffic data, a "pilot" symbol is a modulation symbol for pilot, and a modulation symbol is a complex value for a point in a signal constellation for a modulation scheme. A pilot is typically composed of known modulation symbols that are processed and transmitted in a known manner.

The traffic channels for different terminals in communication with the same base station are typically orthogonal to one another so that no two terminals use the same subband in any given hop period. This avoids intra-cell/sector interference among the terminals communicating with the same base station. The traffic channels for each base station may be pseudo-random with respect to the traffic channels for nearby base stations. Interference between two terminals communicating with two different base stations occurs whenever their traffic channels use the same subband in the same hop period. However, this inter-cell/sector interference is randomized due to the pseudo-random nature of the FH sequences used for the traffic channels.

FIG. 2 shows an exemplary data and pilot transmission scheme with frequency hopping. Traffic data and pilot may also be transmitted in other manners, with or without frequency hopping.

The OFDMA system may utilize various signaling channels at the physical layer to support data transmission on the forward and reverse links. The signaling channels may also be called control channels, overhead channels, and so on. The signaling channels are often used to send (typically) small amounts of signaling for the physical layer and may be processed and transmitted by the physical layer with small amount of delay. The signaling channels needed for each link are typically dependent on various factors such as, e.g., the manner in which traffic data is transmitted, the manner in which signaling is transmitted, the design of the traffic and signaling channels, and so on. Some exemplary signaling channels are described below. For clarity, each signaling channel sent on the forward link (FL) is labeled as "channel_name-FL", and each signaling channel sent on the reverse link (RL) is labeled as "channel_name-RL".

Figure 3:
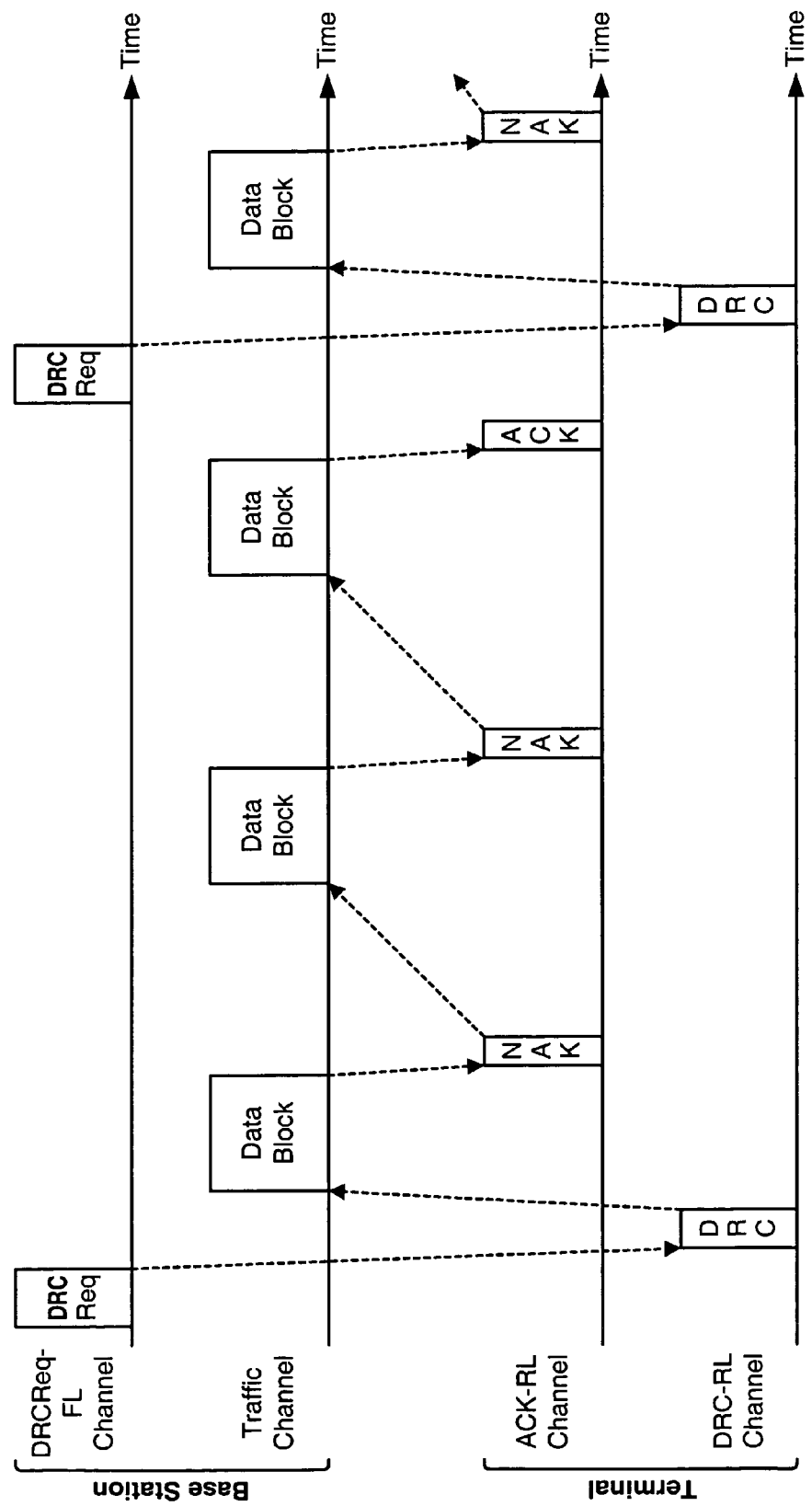
FIG. 3 shows an incremental redundancy (IR) transmission scheme.

FIG. 3 shows an exemplary incremental redundancy (IR) transmission scheme for the forward link, which is also commonly called a hybrid Automatic Repeat ReQuest (H-ARQ) transmission scheme. If a base station has data to send to a terminal, the base station transmits a data rate control (DRC) request on a DRCReq-FL channel to the terminal. This DRC request asks for the received signal quality at the terminal so that data may be sent at an appropriate data rate to the terminal. The terminal receives the DRC request, estimates the received signal quality for the forward link from the base station, and sends a DRC value on a DRC-RL channel to the base station. The received signal quality may be quantified by a signal-to-interference-and-noise ratio (SINR), an energy-per-chip-to-total-noise ratio ($E_c/N_t$), an energy-per-chip-to-noise ratio ($E_c/N_o$), a carrier-to-interference ratio (C/I), or some other signal quality metric. The DRC value may be a quantized version of the SINR measured by the terminal, a data rate deemed to be supported by the measured SINR, or some other information.

The base station receives the DRC value from the terminal and selects a data rate to use for data transmission to the terminal. The base station then processes (e.g., encodes and modulates) a data packet at the selected data rate and partitions the coded packet into multiple data blocks. The first data block may contain sufficient information to allow the terminal to recover the data packet under good channel condition. Each remaining data block contains additional redundancy information for the data packet.

The base station transmits the first data block on a traffic channel to the terminal. The terminal receives the transmitted data block, processes (e.g., demodulates and decodes) the received block, and determines whether the data packet was decoded correctly. If the packet was not decoded correctly, the terminal sends a negative acknowledgment (NAK) on an ACK-RL channel to the base station. The base station then transmits the second data block upon receiving the NAK. The terminal receives the transmitted data block, combines soft-decision symbols for the first and second data blocks, and decodes the packet based on the soft-decision symbols. The terminal sends another NAK on the ACK-RL channel if the packet is not decoded correctly. The block transmission and decoding continue in this manner until the packet is decoded correctly by the terminal or all data blocks for the packet have been transmitted by the base station. The terminal may send new DRC values periodically on the DRC-RL channel, whenever requested by the base station, after successfully decoding data packets, and so on.

For clarity, FIG. 3 shows transmission of both NAKs and ACKs on the ACK-RL channel. For an ACK-based scheme, the terminal transmits an ACK only if a packet is decoded correctly and does not transmit any NAKs. The absence of an ACK is presumed to be a NAK.

As shown in FIG. 3, some delays are incurred for the terminal to decode a packet and send feedback on the ACK-RL channel and for the base station to detect the ACK-RL channel and determine whether another block needs to be sent for the packet. The transmission time line may be partitioned into frames. Each frame may be further partitioned into multiple (Q) slots that may be assigned slot indices of 1 through Q, where Q>1 (e.g., Q=4). One data block may be sent in each slot, and the Q slots in each frame may be used to send data blocks for up to Q different packets to the same terminal or to different terminals. The data blocks for each packet may be sent in consecutive frames and on slots with the same slot index.

Table 1 lists exemplary signaling channels for the forward and reverse links. Each of these signaling channels is described below.

TABLE 1

| Signaling channel | Description |
|---|---|
| DRCReq-FL | Used to send requests for DRC information from the terminals. |
| ACK-FL | Used to send ACKs for packets received from the terminals. |
| ResGrant-FL | Used to send resource grants, or allocation of air-link resources (e.g., subbands) for the reverse link, to the terminals. |
| PC-FL | Used to send power control (PC) commands to direct the terminals to adjust their transmit power. |
| DRC-RL | Used to send DRC information to the base station. |
| ACK-RL | Used to send ACKs for packets received from the base station. |
| ResReq-RL | Used to send requests for air-link resources on the reverse link. |

The DRCReq-FL, DRC-RL, and ACK-RL channels are used for data transmission on the forward link, as shown in FIG. 3. The base station uses the DRCReq-FL channel to send requests for DRC information from the terminal. The terminal uses the DRC-RL channel to send DRC values indicative of its received SINR for the forward link. Each DRC value may be represented by a predetermined number of bits (e.g., four bits). The base station may select a data rate for each packet based on the latest DRC value obtained from the terminal.

In the OFDMA system, the interference level observed by the terminal from other cells/sectors may vary considerably over time due to various factors such as, e.g., power control for forward link transmissions, partial loading on the forward link (e.g., transmitting on only a subset of the N usable subbands), and so on. Consequently, the SINR estimate obtained by the terminal for a given slot may be a poor prediction of the SINR for a future slot.

The base station may select an aggressive data rate for each packet and rely on the IR transmission to correct for prediction error and to ensure robust reception of the packet. The IR transmission allows for less accurate SINR estimates and lower update rate for the DRC values. In one embodiment, the terminal sends DRC values at a low rate. In another embodiment, the base station prompts the terminal to send a DRC value whenever a packet is scheduled to be sent to the terminal. For this embodiment, only terminals that are scheduled to receive packets will send DRC values. The average number of DRC values sent on the reverse link is then equal to the average number of packets sent on the forward link. In yet another embodiment, the base station determines if a new SINR estimate is needed for the terminal, e.g., based on the age of the last DRC value received from the terminal. If the base station determines that the SINR estimate needs updating, then the base station sends a DRC request on the DRCReq-FL channel.

The terminal sends ACKs on the ACK-RL channel for packets received from the base station. The number of ACKs sent per second on the ACK-RL channel is approximately equal to the number of packets sent per second on the forward link. The number of packets sent on the forward link is a function of the applications being carried on the forward link. The ACK rate for the ACK-RL channel may be estimated as the throughput per sector divided by the average packet length on the forward link. The average packet length may be computed based on an assumption on the mix of applications being supported on the forward link.

The base station sends ACKs on the ACK-FL channel for packets received from the terminals. The ACK-FL channel may be operated in the same manner described above for the ACK-RL channel.

The terminal uses the ResReq-RL channel to send requests for air-link resources (e.g., subbands) on the reverse link. The terminal may send a resource request whenever it has data to send on the reverse link. The resource request may include any number of bits. In an embodiment, to minimize overhead for the ResReq-RL channel, the resource request consists of one bit and informs the base station that the terminal has data to send. The base station may assign a predetermined amount of reverse link resources to the terminal, e.g., a certain number of subbands, a traffic channel for a certain data rate (e.g., 9.6 Kbps), and so on. In another embodiment, the resource request indicates a specific data rate that the terminal has selected from among multiple data rates supported by the OFDMA system. The base station may assign the terminal with reverse link resources for the requested data rate or some other data rate. In yet another embodiment, the resource request indicates the amount of data (or buffer size) to be sent by the terminal. The base station may allocate reverse link resources to the terminal based on the buffer size.

The reverse link allocation may indicate specific parameters to use for reverse link transmission (e.g., specific subbands, code rate, modulation scheme, and transmit power level to use for reverse link transmission). The reverse link allocation may also allow the terminal some flexibility in the reverse link transmission, e.g., to use a higher code rate and/or a higher order modulation scheme to send more data, if needed. For example, the terminal may be allocated 19.2 KHz of bandwidth on the reverse link and may be allowed to transmit at a data rate of 9.6 Kbps or 19.2 kbps on this 19.2

KHz bandwidth. The terminal may use more transmit power when transmitting at the higher data rate to ensure reliable data reception by the base station. The allocation of a flexible rate reduces the number of bits needed for the resource request sent on the ResReq-RL channel.

The base station uses the ResGrant-FL channel to send allocation of reverse link resources to the terminals. Each terminal in the OFDMA system may be assigned a Medium Access Channel (MAC) identifier that unambiguously identifies that terminal. A grant message sent on the ResGrant-FL channel may convey various types of information and may have any format. For example, a grant message sent to a given terminal may include (1) the MAC identifier (ID) of the terminal, (2) a channel ID for the traffic channel assigned to the terminal, and (3) possibly some other parameters. The number of bits to use for the MAC ID and channel ID are dependent on the system design, the MAC design, and possibly other factors. A 10-bit MAC ID may be adequate to cover both active and idle terminals in the OFDMA system, although some other MAC ID sizes may also be used. A 6-bit channel ID may be used to identify 64 traffic channels. For example, if the system bandwidth is 1.2288 MHz, then each of the 64 traffic channels may have a bandwidth of 19.2 KHz. Other channel ID sizes may also be used.

The terminal may be initially assigned one traffic channel. The terminal may request additional bandwidth on the reverse link, e.g., in a resource request or in a data packet sent on the reverse link. The base station may then assign one or more additional traffic channels to the terminal and may send the channel ID of each assigned traffic channel in a grant message.

The base station uses the PC-FL channel to send PC commands to the terminals. The signaling transmission from each terminal on the reverse link, if sent as underlay across all N usable subbands, acts as interference to the signaling and data transmissions from other terminals on the reverse link. The transmit power for the signaling transmission from each terminal may be adjusted to achieve the desired performance while reducing the amount of interference to other terminals.

Each base station transmits a pilot on the forward link, which is used by the terminals for channel estimation, timing and frequency acquisition, data detection, and so on. Each terminal may also transmit a pilot on the reverse link. The pilot for each link may be designed based on the specific requirements for that link and may be viewed as another signaling channel.

The signaling channels for the forward and reverse links may carry different types of signaling and may use various formats. The signaling channels may also be transmitted in various manners. Some exemplary designs and transmission schemes for the signaling channels are described below.

A given signaling channel on a given (forward or reverse) link may be efficiently transmitted as underlay to other transmissions that may be sent on the same link. Each terminal in the OFDMA system may be assigned a different PN code that uniquely identifies that terminal. The signaling data for a given terminal may be spectrally spread over all or a portion of the system bandwidth with the PN code assigned to that terminal. In one embodiment, the signaling data for the terminal is spread over the entire system bandwidth and is underlay to other transmissions. In another embodiment, the signaling data for the terminal is spread over the portion of the bandwidth that is assigned to the terminal and is underlay to the data transmission for that terminal. In yet another embodiment, the signaling data for the terminal is spread over a portion of the bandwidth that is specifically allocated for signaling for all terminals and is underlay to signaling transmissions for the other terminals. In yet another embodiment, the signaling data is spread over a portion of the bandwidth that is specifically allocated for signaling and is not used for data transmission. For this embodiment, the system bandwidth may be divided into (1) a signaling bandwidth where signaling data may be sent in a CDMA fashion and (2) a reservation-based data transmission bandwidth where traffic data may be transmitted based on prior reservations or assignments. The signaling data may also be spread in other manners.

Each signaling bit is transmitted with sufficient energy to achieve reliable detection of that bit by a receiving entity. If the signaling bit is spread over all or a portion of the system bandwidth, then the energy for the bit is correspondingly spread across the bandwidth used to send the bit. The signaling bit will then have a large spreading factor or processing gain when spread over a large portion of the bandwidth and may be transmitted at a low power level. If the data rate for a signaling channel is low, then the received power at the receiving entity for the signaling channel may be below thermal noise and may only marginally impact the performance of the other transmissions concurrently received by the receiving entity.

As an example, the OFDMA system may have N=2048 usable subbands. One signaling bit may be spread across all 2048 subbands in one OFDM symbol period with a user-specific PN code of length 2048. The spread signaling bit for each subband is summed with the data symbol (if any) being sent on the subband and would cause interference to that data symbol. However, since one signaling bit is spread across 2048 subbands, the interference caused to the data symbols will be small. For example, if the SINR required to reliably detect the signaling bit is 5 dB and the processing gain is 33 dB for 2048 subbands, then the signaling bit may be sent at 28 dB (or 5 dB−33 dB=−28 dB) below the traffic data.

Figure 4A:
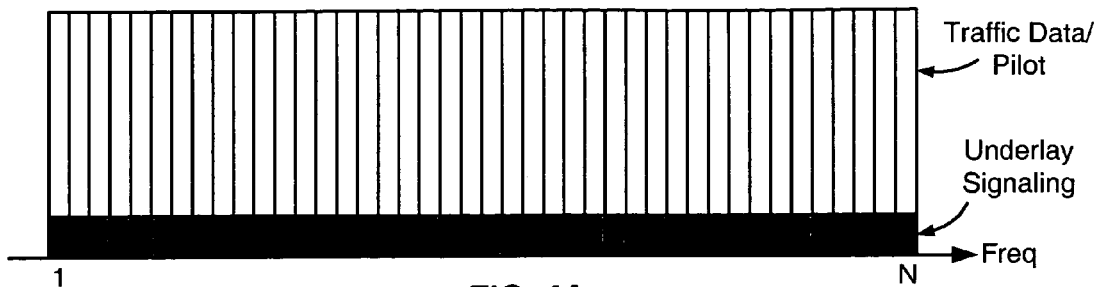
FIGS. 4A through 4D illustrate different signaling transmission schemes.

FIG. 4A shows an exemplary transmission of signaling data as underlay to traffic data and pilot on the forward link. In this example, the signaling data for all terminals is spread across the entire system bandwidth or all N usable subbands. The signaling is small in amplitude relative to the traffic data and pilot because of the spreading with the PN codes. The signaling data for all terminals is superimposed on top of one another. Each terminal can recover its signaling data by performing the complementary despreading with its assigned PN code, as described below.

Figure 4B:
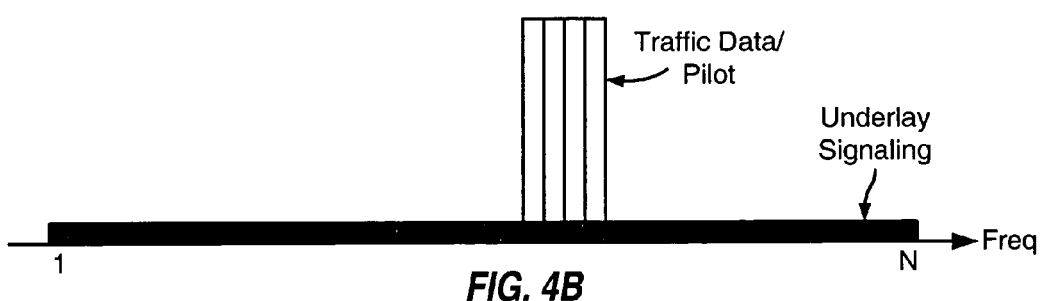

FIG. 4B shows an exemplary transmission of signaling data as underlay to traffic data and pilot on the reverse link. In this example, a terminal transmits traffic data on a traffic channel that is allocated a group of S subbands, e.g., as shown in FIG. 2. The terminal spreads and sends its signaling data on all N usable subbands.

For both the forward and reverse links, transmission of the signaling channels as underlay avoids the need to allocate specific bandwidth or subbands for these signaling channels. Some signaling channels (e.g., the ResReq-RL channel) may only be needed at certain (sporadic) times when there is signaling data to send on these signaling channels. Allocating specific bandwidth for these signaling channels would be inefficient since the allocated bandwidth may not be fully utilized much of the time. With underlay transmission, no bandwidth is explicitly allocated for the signaling channels. Instead, these signaling channels are transmitted as background transmission whenever there is signaling data to send.

On the reverse link, each terminal may have only a small amount of signaling data to send for each signaling channel. Moreover, the transmission on each signaling channel may be sporadic. Explicit allocation of bandwidth to each terminal for its signaling channels may be highly inefficient. The underlay transmission allows all terminals to share the entire system bandwidth or a designated portion of the system bandwidth for signaling transmission. Furthermore, statistical multiplexing gain may be achieved for the signaling transmissions from all terminals on the reverse link. If the terminals independently transmit their signaling channels as underlay, then the received power at the base station for the underlay transmissions from all of the terminals will be randomized and appear as (more or less) random noise to the data transmissions, similar to the reverse link in a CDMA system. The underlay transmissions result in a "rise over thermal" noise, which is additional noise over thermal noise. The magnitude of the additional noise is dependent on the amount of signaling data sent by all terminals as underlay on the reverse link. The underlay transmission is scalable because if more signaling data is sent, then the rise over thermal increases and traffic data throughput decreases accordingly.

For the embodiment shown in FIG. 2, a terminal is allocated S subbands in each hop period of R symbol periods and may transmit up to S×R modulation symbols in each hop period. The terminal may transmit its pilot in a TDM manner as shown in FIG. 2 (e.g., on all S subbands in one or more symbol periods of each hop period) or in an FDM manner (e.g., on one or more subbands in all R symbol periods of each hop period). In any case, some (e.g., 10 to 20%) of the S×R modulation symbols are pilot symbols, and the remaining modulation symbols may be data symbols.

The terminal may also transmit its pilot as underlay on the reverse link. In this case, a pilot symbol and a data symbol may be sent on the same subband. S×R pilot symbols may be sent on the S subbands in the R symbol periods of each hop period as underlay to the traffic data. The terminal may scale the data and pilot symbols for each subband to achieve the desired channel estimation and data detection performance.

A receiving entity may estimate and cancel the interference from a signaling transmission sent as underlay to reduce the impact of this transmission. The receiving entity detects the signaling transmission, estimates the interference due to the detected signaling, and subtracts the interference estimate from the received signal to obtain an interference-canceled signal having improved signal quality. The interference cancellation may be performed in the time or frequency domain. For frequency-domain interference cancellation, the receiving entity may multiply the detected signaling data for each subband with a channel gain estimate for that subband to generate the interference component for the subband. The receiving entity may then subtract the interference component for each subband from the received signal component for that subband to obtain the interference-canceled signal component for the subband. This cancels the effect of the detected signaling on each subband. For time-domain interference cancellation, the receiving entity may multiply the detected signaling with a channel impulse response estimate to obtain a time-domain interference estimate. The receiving entity may then subtract this interference estimate from the received signal to obtain a time-domain interference-canceled signal. In any case, the receiving entity performs data detection on the interference-canceled signal instead of the received signal.

On the forward link, certain types of signaling (e.g., ACKs, resource grants, and so on) for all of the terminals may be multiplexed onto a shared signaling channel that may be used for all terminals. The base station has knowledge of the signaling data to be sent to the terminals and can efficiently perform the multiplexing of the signaling data. For example, messages for resource grants for all terminals may be multiplexed and sent on a shared ResGrant-FL channel. The shared signaling channel may be allocated a certain number of subbands in each symbol period and may also hop across the N usable subbands, e.g., as shown in FIG. 2.

The terminals may be located throughout the OFDMA system and may achieve different received SINRs for the same amount of transmit power used for the shared signaling channel. For example, if the total transmit power available at the base station is evenly distributed across the N usable subbands, then some terminals may achieve received SINRs greater than the target SINR while other terminals may achieve received SINRs lower than the target SINR. To ensure that all terminals can reliably receive their resource grant messages, more transmit power may be used for the shared signaling channel for each terminal with a received SINR lower than the target SINR. The additional transmit power for the shared signaling channel may come from the transmit power used for the remaining subbands. As an example, if a received SINR of 5 dB is needed for reliable detection of the shared signaling channel and a terminal achieves a received SINR of −10 dB, then the transmit power for the shared signaling channel may be boosted by 15 dB so that the terminal can achieve the required SINR of 5 dB. If there are 2048 usable subbands and 32 subbands are allocated to the shared signaling channel, then the transmit power for this channel may be increased by 15 dB by reducing the transmit power for each remaining subband by 3 dB. If another terminal achieves a received SINR of −5 dB, then the transmit power for the shared signaling channel may be boosted by 10 dB by reducing the transmit power for each remaining subband by 0.75 dB. The received SINR achieved by each terminal may be ascertained, e.g., based on the DRC value sent by the terminal.

The base station may send messages for different terminals on the shared signaling channel using TDM, FDM, or code division multiplexing (CDM). The base station may also spread each message across all of the subbands allocated to the shared signaling channel.

Figure 4C:
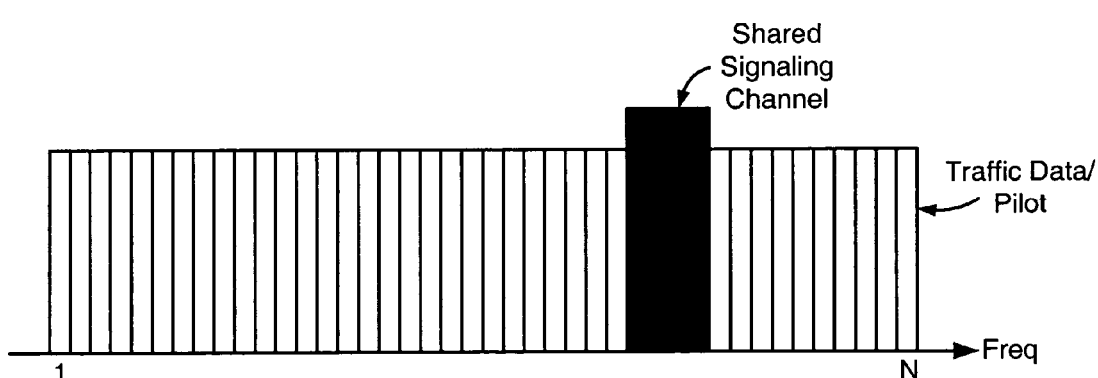

FIG. 4C shows an exemplary transmission of the shared signaling channel. In this example, traffic data and pilot are transmitted at the same power level, and the signaling data for the shared signaling channel is transmitted at a higher power level than that of the traffic data and pilot. The power level for the shared signaling channel can change over time based on the received SINRs for the terminals receiving this shared signaling channel.

Using a fixed number of subbands for the shared signaling channel and adjusting the transmit power to achieve the required SNR at the terminals can simplify the processing by the terminals for the shared signaling channel. Furthermore, the total transmit power may be efficiently shared between signaling and traffic data to achieve good performance for both types of data. More transmit power may be used for the shared signaling channel whenever needed. All of the transmit power may be used for traffic data if no signaling is being sent in any given symbol period. The number of subbands to use for the shared signaling channel may be determined by the performance of the best terminal, the nominal terminal, or some other terminal. Different types of signaling (e.g., ACKs and resource grants) may be sent on different shared signaling channels. Each shared signaling channel may be operated as described above.

Certain types of signaling (e.g., ACKs) for the forward link may also be sent on dedicated signaling channels, e.g., one dedicated signaling channel for each terminal. Dedicated signaling channels may be used if a sufficient amount of signaling data is sent in a somewhat regular manner. For example, each terminal that is actively transmitting on the reverse link may be allocated one or more traffic channels, and each reverse link traffic channel may be associated with an ACK-FL channel. For each reverse link traffic channel that is actively used, the corresponding ACK-FL channel is used to send ACKs for the traffic data. The dedicated signaling channels may be transmitted in an FDM or TDM manner. For FDM, each dedicated signaling channel may be allocated a certain number of subbands, which may be distributed across the N usable subbands to achieve frequency diversity. For TDM, a certain number of subbands are allocated for all dedicated signaling channels, and each dedicated signaling channel may be assigned certain symbol periods within a frame or slot. For both FDM and TDM, the transmit power for each dedicated signaling channel may be increased or decreased from a nominal value, as needed, by taking transmit power for allocated to traffic data/pilot, similar to that described above for the shared signaling channel. The transmit power for each dedicated signaling channel may also be used for traffic data/pilot if no signaling is being sent on that signaling channel.

Figure 4D:
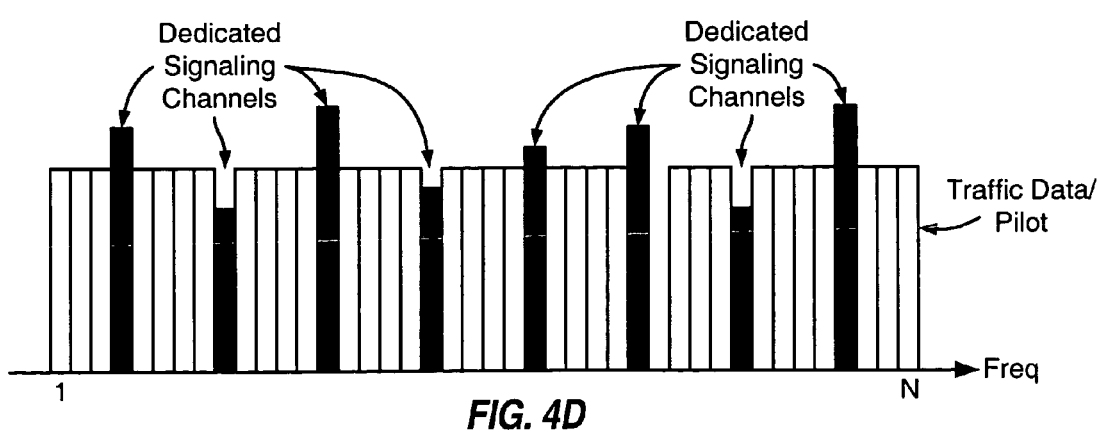

FIG. 4D shows an exemplary transmission of the dedicated signaling channels. In this example, different dedicated signaling channels are transmitted at different power levels. For simplicity, FIG. 4D shows each dedicated signaling channel being allocated one or more contiguous subbands. The subbands for each dedicated signaling channel may also be distributed across the N usable subbands to achieve frequency diversity.

Figure 5:
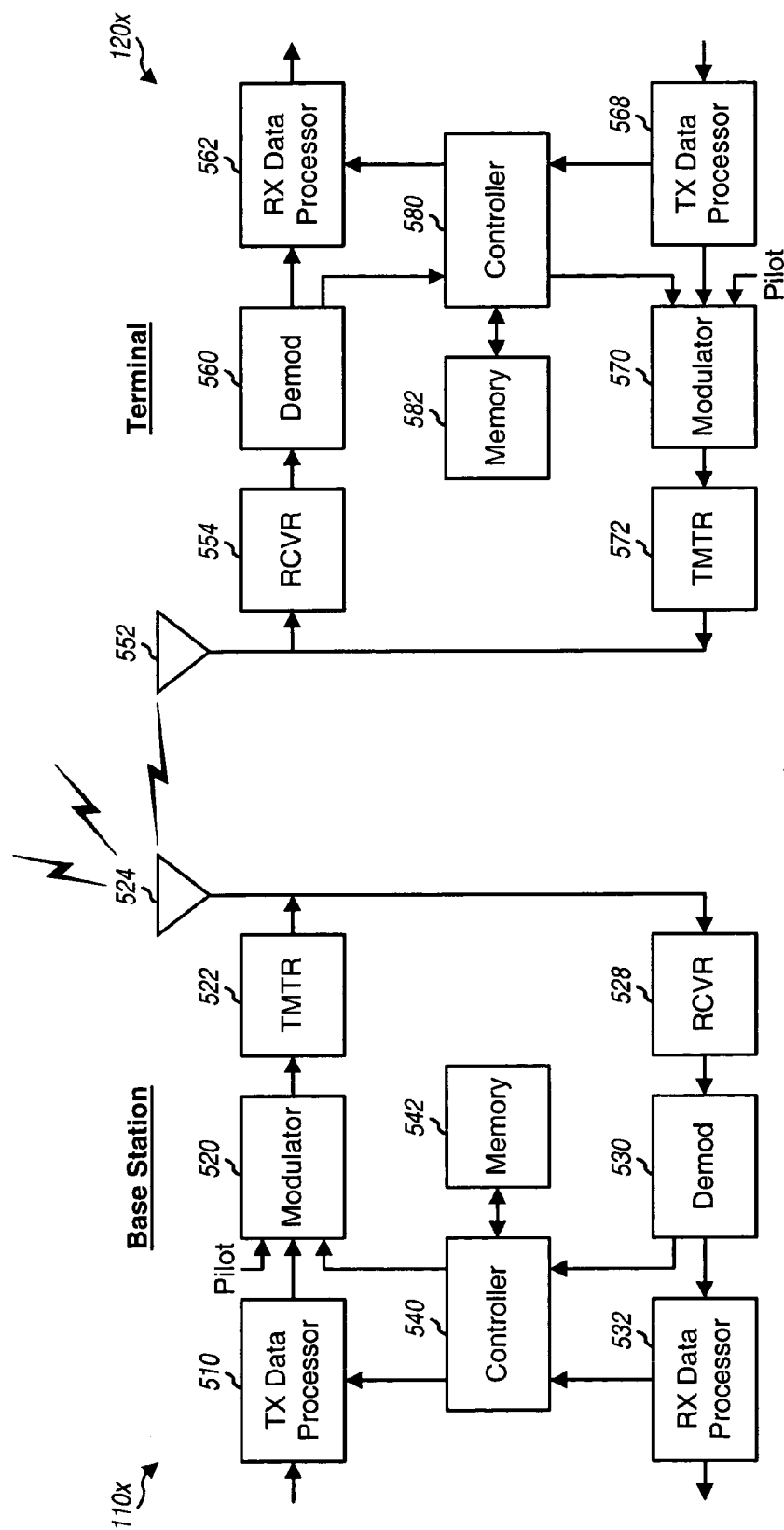
FIG. 5 shows a block diagram of a base station and a terminal.

FIG. 5 shows a block diagram of a base station 110x and a terminal 120x, which are one of the base stations and terminals in FIG. 1. For the forward link, at base station 110x, a transmit (TX) data processor 510 receives traffic data for all of the terminals, processes (e.g., encodes, interleaves, and symbol maps) the traffic data for each terminal based on a coding and modulation scheme selected for that terminal, and provides data symbols for each terminal. A modulator 520 receives the data symbols for all terminals, pilot symbols, and signaling for all terminals (e.g., from a controller 540), performs modulation for each type of data as described below, and provides a stream of output chips. A transmitter unit (TMTR) 522 processes (e.g., converts to analog, filters, amplifies, and frequency upconverts) the output chip stream to generate a modulated signal, which is transmitted from an antenna 524.

At terminal 120x, the modulated signal transmitted by base station 110x and possibly other base stations are received by an antenna 552. A receiver unit (RCVR) 554 processes (e.g., conditions and digitizes) the received signal from antenna 552 and provides received samples. A demodulator (Demod) 560 processes (e.g., demodulates and detects) the received samples and provides detected data symbols for terminal 120x. Each detected data symbol is a noisy estimate of a data symbol transmitted by base station 110x to terminal 120x. A receive (RX) data processor 562 processes (e.g., symbol demaps, deinterleaves, and decodes) the detected data symbols and provides decoded data.

For the reverse link, at terminal 120x, traffic data is processed by a TX data processor 568 to generate data symbols. A modulator 570 processes the data symbols, pilot symbols, and signaling from terminal 120x for the reverse link and provides an output chip stream, which is further conditioned by a transmitter unit 572 and transmitted from antenna 552. At base stations 110x, the modulated signals transmitted by terminal 120x and other terminals are received by antenna 524, conditioned and digitized by a receiver unit 528, and processed by a demodulator 530 to detect the data symbols and signaling sent by each terminal. An RX data processor 532 processes the detected data symbols for each terminal and provides decoded data for the terminal. Controller 540 receives the detected signaling data and controls the data transmissions on the forward and reverse links.

Controllers 540 and 580 direct the operation at base station 110x and terminal 120x, respectively. Memory units 542 and 582 store program codes and data used by controllers 540 and 580, respectively.

Figure 6:
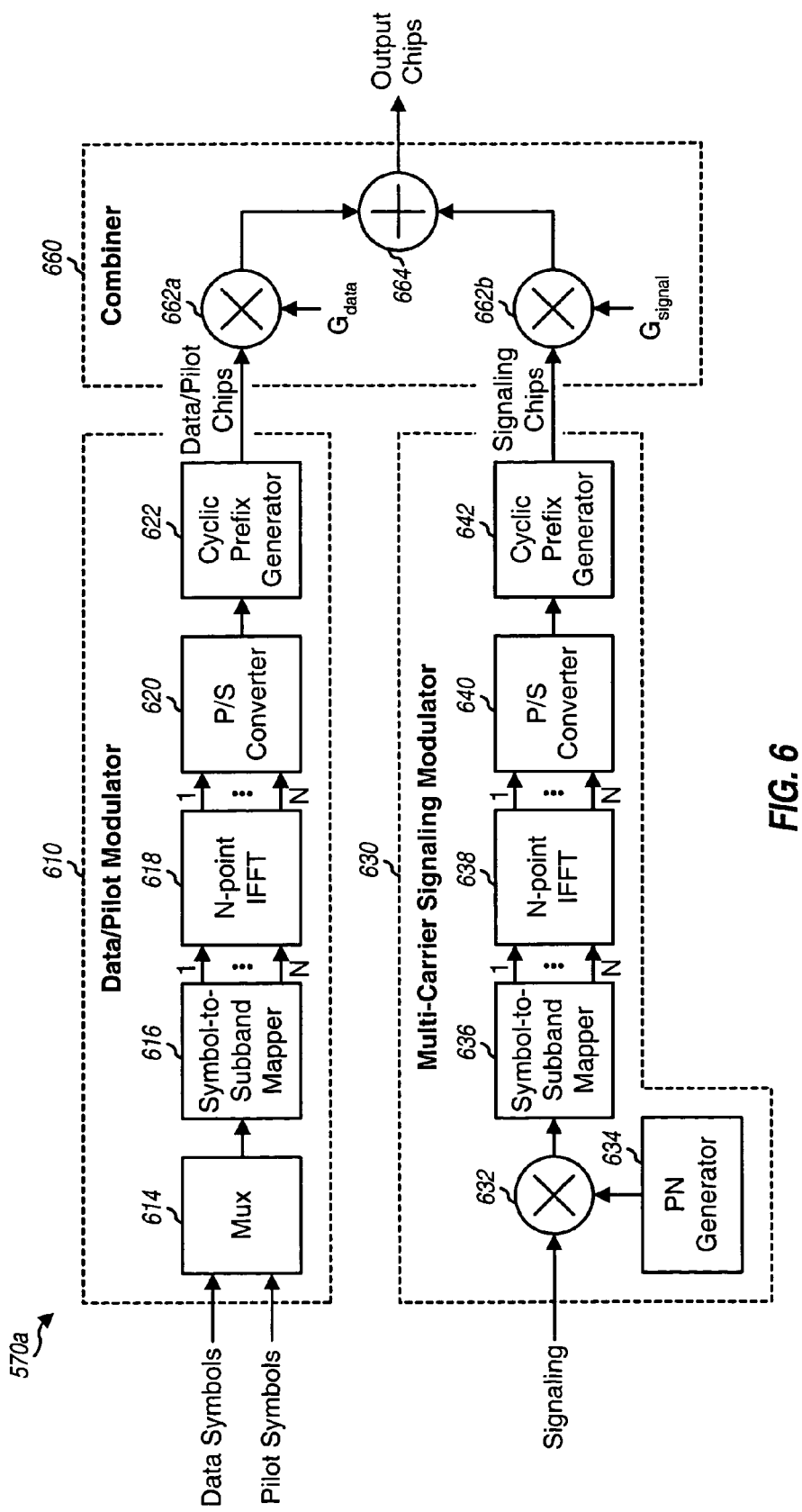
FIG. 6 shows a modulator with a data/pilot modulator, a multi-carrier signaling modulator, and a time-domain combiner.

FIG. 6 shows a block diagram of a modulator 570a, which may be used for modulator 520 or 570 in FIG. 5. Modulator 570a includes (1) a data/pilot modulator 610 that can send data and pilot symbols in a TDM or FDM manner, (2) a multi-carrier signaling modulator 630 that can send signaling as underlay on all of a subset of the N usable subbands, and (3) a combiner 660 that performs time-domain combining.

Within data/pilot modulator 610, a multiplexer (Mux) 614 receives and multiplexes data symbols with pilot symbols. For each OFDM symbol period, a symbol-to-subband mapper 616 maps the multiplexed data and pilot symbols onto the subbands assigned for data and pilot transmission in that symbol period. Mapper 616 also provides a signal value of zero for each subband not used for transmission. For each symbol period, mapper 616 provides N transmit symbols for the N total subbands, where each transmit symbol may be a data symbol, a pilot symbol, or a zero-signal value. For each symbol period, an inverse fast Fourier transform (IFFT) unit 618 transforms the N transmit symbols to the time domain with an N-point IFFT and provides a "transformed" symbol that contains N time-domain chips. Each chip is a complex value to be transmitted in one chip period. A parallel-to-serial (P/S) converter 620 serializes the N time-domain chips. A cyclic prefix generator 622 repeats a portion of each transformed symbol to form an OFDM symbol that contains N+C chips, where C is the number of chips being repeated. The repeated portion is often called a cyclic prefix and is used to combat inter-symbol interference (ISI) caused by frequency selective fading. An OFDM symbol period corresponds to the duration of one OFDM symbol, which is N+C chip periods. Cyclic prefix generator 622 provides a stream of data/pilot chips. IFFT unit 618, P/S converter 620, and cyclic prefix generator 622 form an OFDM modulator.

Within signaling modulator 630, a multiplier 632 receives and multiplies signaling data with a PN sequence from a PN generator 634 and provides spread signaling data. The signaling data for each terminal is spread with the PN sequence assigned to the terminal. A symbol-to-subband mapper 636 maps the spread signaling data onto the subbands used for signaling transmission, which may be all or a subset of the N usable subbands. An IFFT unit 638, a P/S converter 640, and a cyclic prefix generator 642 perform OFDM modulation on the mapped and spread signaling data and provide a stream of signaling chips.

Within combiner 660, a multiplier 662a multiplies the data/pilot chips from modulator 610 with a gain of $G_{data}$. A multiplier 662b multiplies the signaling chips from modulator 630 with a gain of $G_{signal}$. The gains $G_{data}$ and $G_{signal}$ determine the amount of transmit power to use for traffic data and signaling, respectively, and may be set to achieve good performance for both. A summer 664 sums the scaled chips from multipliers 662a and 662b and provides the output chips for modulator 570a.

Figure 7:
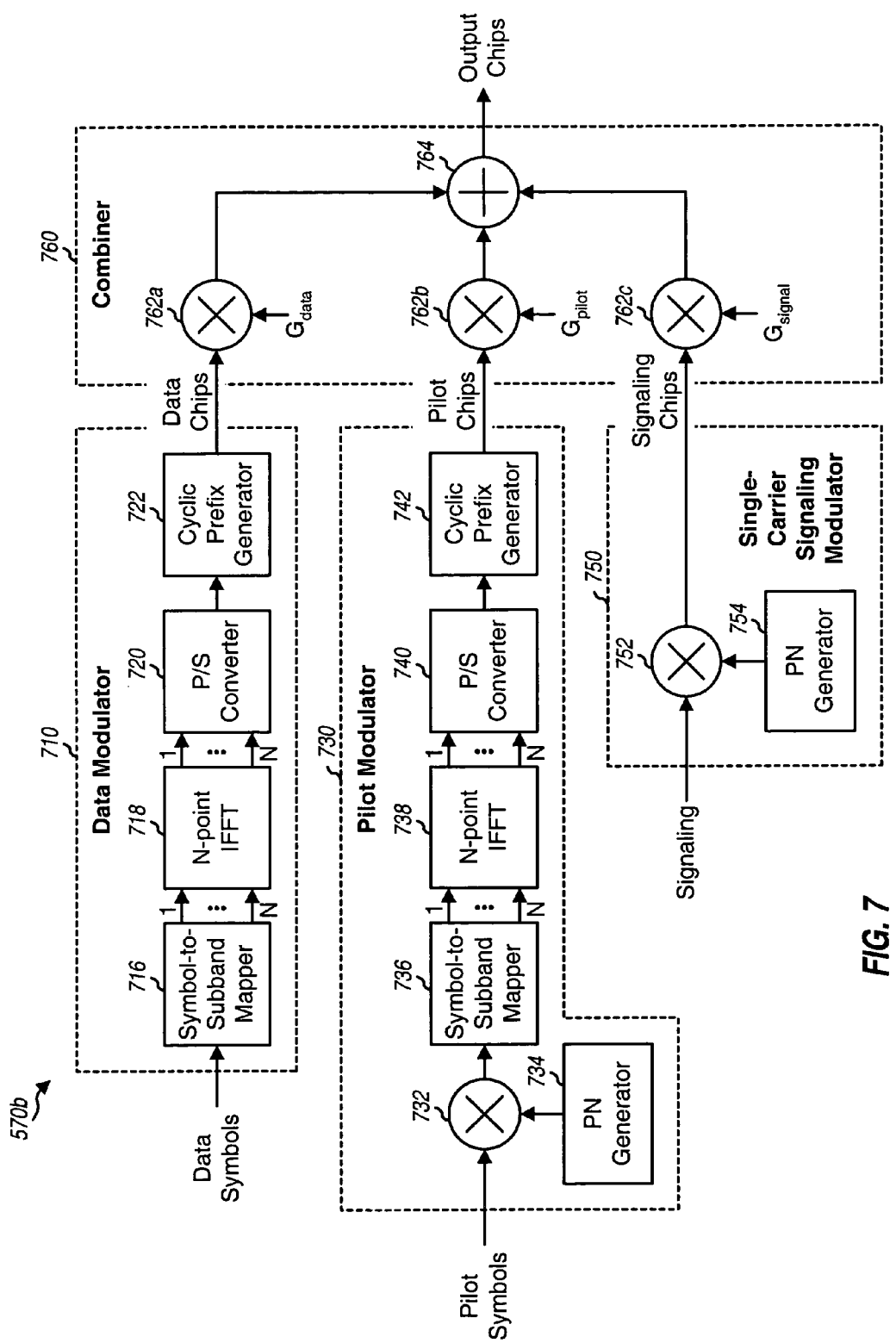
FIG. 7 shows a modulator with a data modulator, a pilot modulator, a single-carrier signaling modulator, and a time-domain combiner.

FIG. 7 shows a block diagram of a modulator 570b, which may also be used for modulator 520 or 570 in FIG. 5. Modulator 570b includes (1) a data modulator 710 that can send data symbols on subbands used for data transmission, (2) a pilot modulator 730 that can send pilot symbols as underlay on all of a subset of the N usable subbands, (3) a single-carrier signaling modulator 750 that can send signaling as underlay on all N usable subbands, and (4) a combiner 760 that performs time-domain combining.

Data modulator 710 includes a symbol-to-subband mapper 716, an IFFT unit 718, a P/S converter 720, and a cyclic prefix generator 722 that operate in the manner described above for units 616, 618, 620, and 622, respectively, in FIG. 6. Data modulator 710 performs OFDM modulation on data symbols and provides data chips.

Pilot modulator 730 includes a multiplier 732, a PN generator 734, a symbol-to-subband mapper 736, an IFFT unit 738, a P/S converter 740, and a cyclic prefix generator 742 that operate in the manner described above for units 632, 634, 636, 638, 640, and 642, respectively, in FIG. 6. However, pilot modulator 730 operates on pilot symbols instead of signaling data. Pilot modulator 730 spreads the pilot symbols with a PN sequence, maps the spread pilot symbols onto subbands and symbol periods used for pilot transmission, and performs OFDM modulation on the mapped and spread pilot symbols to generate pilot chips. Different PN codes may be used for pilot and signaling. The pilot symbols may be spread over frequency, time, or both by selecting the proper PN code for the pilot. For example, a pilot symbol may be spread across S subbands in one symbol period by multiplying with an S-chip PN sequence, spread across R symbol periods on one subband by multiplying with an R-chip PN sequence, or spread across all S subbands and R symbol periods of one hop period by multiplying with an S×R-chip PN sequence.

Signaling modulator 750 includes a multiplier 752 and a PN generator 754 that operate in the manner described above for units 632 and 634, respectively, in FIG. 6. Signaling modulator 750 spreads the signaling data across all N usable subbands in the time domain and provides signaling chips. Signaling modulator 750 performs spreading in a manner similar to that performed for the reverse link in IS-95 and IS-2000 CDMA systems.

Within combiner 760, multipliers 762a, 762b, and 762c multiply the chips from modulators 710, 730, and 750, respectively, with gains of $G_{data}$, $G_{pilot}$, and $G_{signal}$, respectively, which determine the amount of transmit power used for traffic data, pilot, and signaling, respectively. A summer 764 sums the scaled chips from multipliers 762a, 762b, and 762c and provides the output chips for modulator 570b.

FIGS. 6 and 7 show two embodiments of a modulator whereby the traffic data, pilot, and signaling are combined in the time domain. The traffic data, pilot, and signaling may also be combined in the frequency domain.

Figure 8:
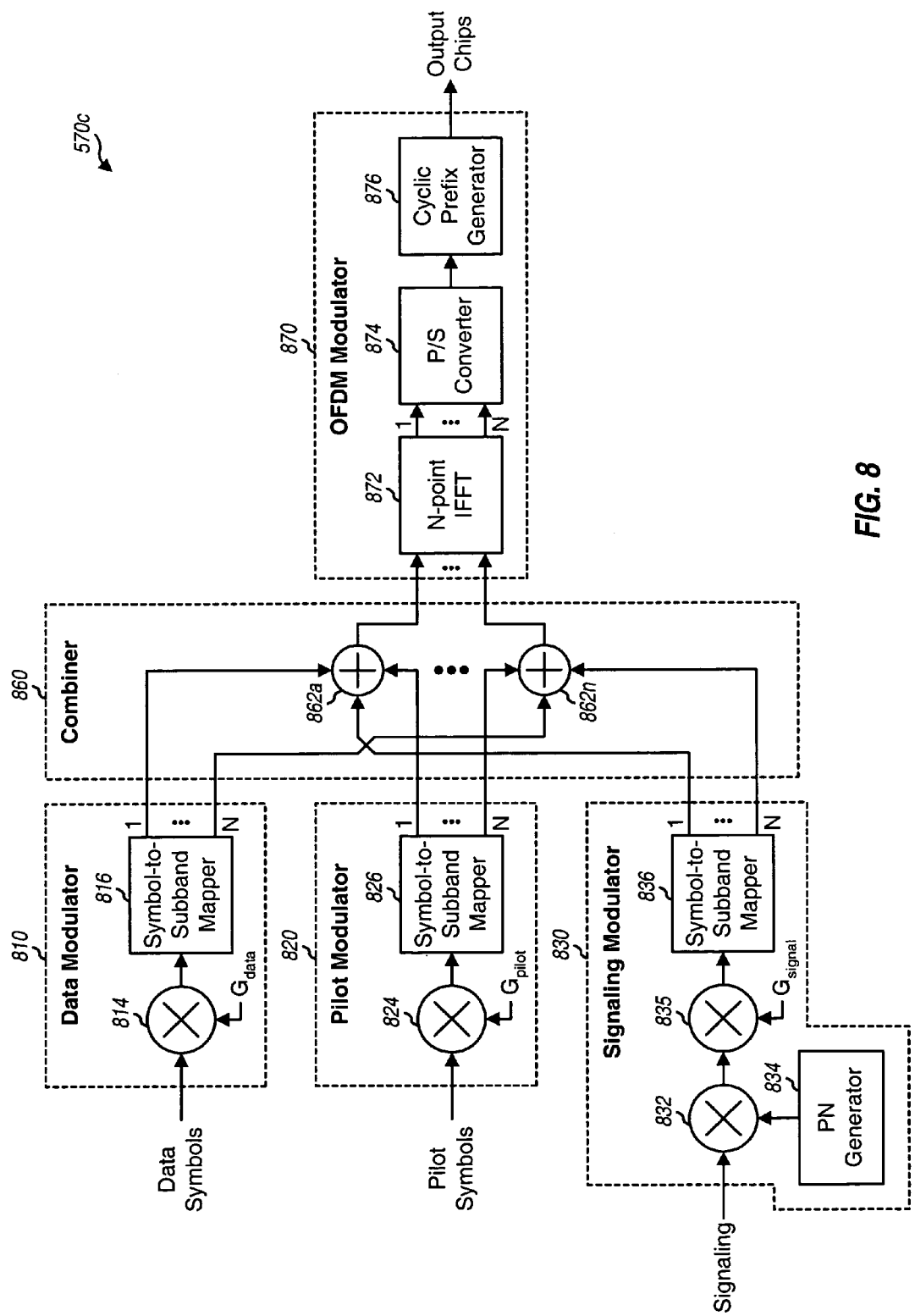
FIG. 8 shows a modulator with a data modulator, a pilot modulator, a multi-carrier signaling modulator, and a frequency-domain combiner.

FIG. 8 shows a block diagram of a modulator 570c, which may also be used for modulator 520 or 570 in FIG. 5. Modulator 570c includes (1) a data modulator 810 that maps data symbols onto subbands used for data transmission (2) a pilot modulator 820 that maps pilot symbols onto subbands used for pilot transmission, (3) a multi-carrier signaling modulator 830, (4) a combiner 860 that performs frequency-domain combining, and (5) an OFDM modulator 870.

Within data modulator 810, a multiplier 814 receives and scales data symbols with a gain of $G_{data}$ and provides scaled data symbols. A symbol-to-subband mapper 816 then maps the scaled data symbols onto the subbands used for data transmission. Within pilot modulator 820, a multiplier 824 receives and scales pilot symbols with a gain of $G_{pilot}$ and provides scaled pilot symbols. A symbol-to-subband mapper 826 then maps the scaled pilot symbols onto the subbands used for pilot transmission. Within signaling modulator 830, a multiplier 832 spreads signaling data across the subbands used for signaling transmission with a PN sequence generated by a PN generator 834. A multiplier 835 scales the spread signaling data with a gain of $G_{signal}$ and provides scaled and spread signaling data, which is then mapped onto the subbands used for signaling transmission by a symbol-to-subband mapper 836. Combiner 860 includes N summers 862a through 862n for the N total subbands. For each symbol period, each summer 862 sums the scaled data, pilot, and signaling symbols for the associated subband and provides a combined symbol. OFDM modulator 870 includes an IFFT unit 872, a P/S converter 874, and a cyclic prefix generator 876 that operate in the manner described above for units 618, 620, and 622, respectively, in FIG. 6. OFDM modulator 870 performs OFDM modulation on the combined symbols from combiner 860 and provides output chips for modulator 570c.

FIGS. 6 through 8 show three embodiments of a modulator that may be used for the base station and terminal. Other designs may also be used for the modulator, and this is within the scope of the invention. For example, in FIG. 6, the output of multiplier 632 may be provided to another input of multiplexer 614. Mapper 616 may then map the data symbols, pilot symbols, and spread signaling data onto the proper subbands designated for traffic data, pilot, and signaling, respectively. This may be used to achieve the transmission shown in FIG. 4C.

For simplicity, FIGS. 6 through 8 show one type of signaling being processed. Different types of signaling (e.g., DRC, ACK-RL, and resource requests) may be multiplexed together (or orthogonalized in some manner) and processed using one signaling modulator. Alternatively, different types of signaling may be processed using different signaling modulators, which allows for flexibility. For example, on the forward link, the DRC requests may be spread across all N usable subbands and sent as underlay, the resource grant messages may be sent on a shared ResGrant-FL channel, and the ACKs for different terminals may be sent on dedicated ACK-FL channels. Different signaling modulators may be used for the DRCReq-FL, ResGrant-FL, and ACK-FL channels. Different signaling modulators may also be used for different signaling channels on the reverse link.

Figure 9:
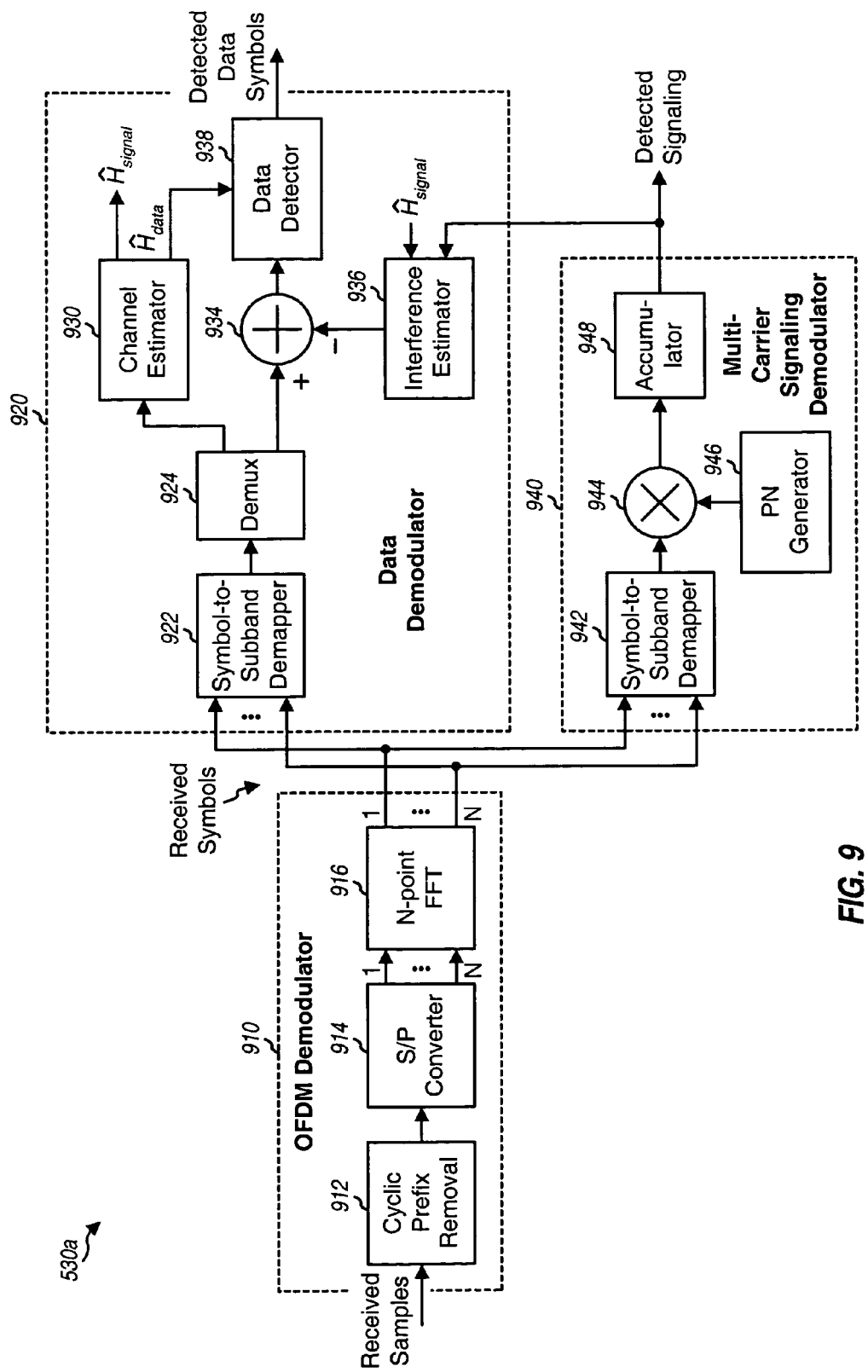
FIG. 9 shows a demodulator for the modulator in FIG. 6.

FIG. 9 shows a block diagram of a demodulator 530a, which may be used for demodulator 530 or 560 in FIG. 5. Demodulator 530a performs processing complementary to the processing performed by modulator 570a in FIG. 6. Demodulator 530a includes an OFDM demodulator 910, a data demodulator 920, and a multi-carrier signaling demodulator 940.

Within OFDM demodulator 910, a cyclic prefix removal unit 912 obtains N+C received samples for each OFDM symbol period, removes the cyclic prefix, and provides N received samples for a received transformed symbol. A serial-to-parallel (S/P) converter 914 provides the N received samples in parallel form. An FFT unit 916 transforms the N received samples to the frequency domain with an N-point FFT and provides N received symbols for the N total subbands.

Within signaling demodulator 940, a symbol-to-subband demapper 942 obtains the received symbols for all N total subbands from OFDM demodulator 910 and passes only the received symbols for the subbands used for signaling transmission. A multiplier 944 multiplies the received symbols from demapper 942 with the PN sequence used for signaling, which is generated by a PN generator 946. An accumulator 948 accumulates the output of multiplier 944 over the length of the PN sequence and provides detected signaling data.

Within data demodulator 920, a symbol-to-subband demapper 922 obtains the received symbols for all N total subbands and passes only the received symbols for the subbands used for traffic data and pilot. A demultiplexer (Demux) 924 provides received pilot symbols to a channel estimator 930 and received data symbols to a summer 934. Channel estimator 930 processes the received pilot symbols and derives a channel estimate $\hat{H}_{data}$ for the subbands used for traffic data and a channel estimate $\hat{H}_{signal}$ for the subbands used for signaling. An interference estimator 936 receives the detected signaling data and the $\hat{H}_{signal}$ channel estimate, estimates the interference due to the detected signaling data, and provides an interference estimate to summer 934. Summer 934 subtracts the interference estimate from the received data symbols and provides interference-canceled symbols. The interference estimation and cancellation may be omitted, e.g., if the $\hat{H}_{signal}$ channel estimate is not available. A data detector 938 performs data detection (e.g., matched filtering, equalization, and so on) on the interference-canceled symbols with the $\hat{H}_{data}$ channel estimate and provides detected data symbols.

Figure 10:
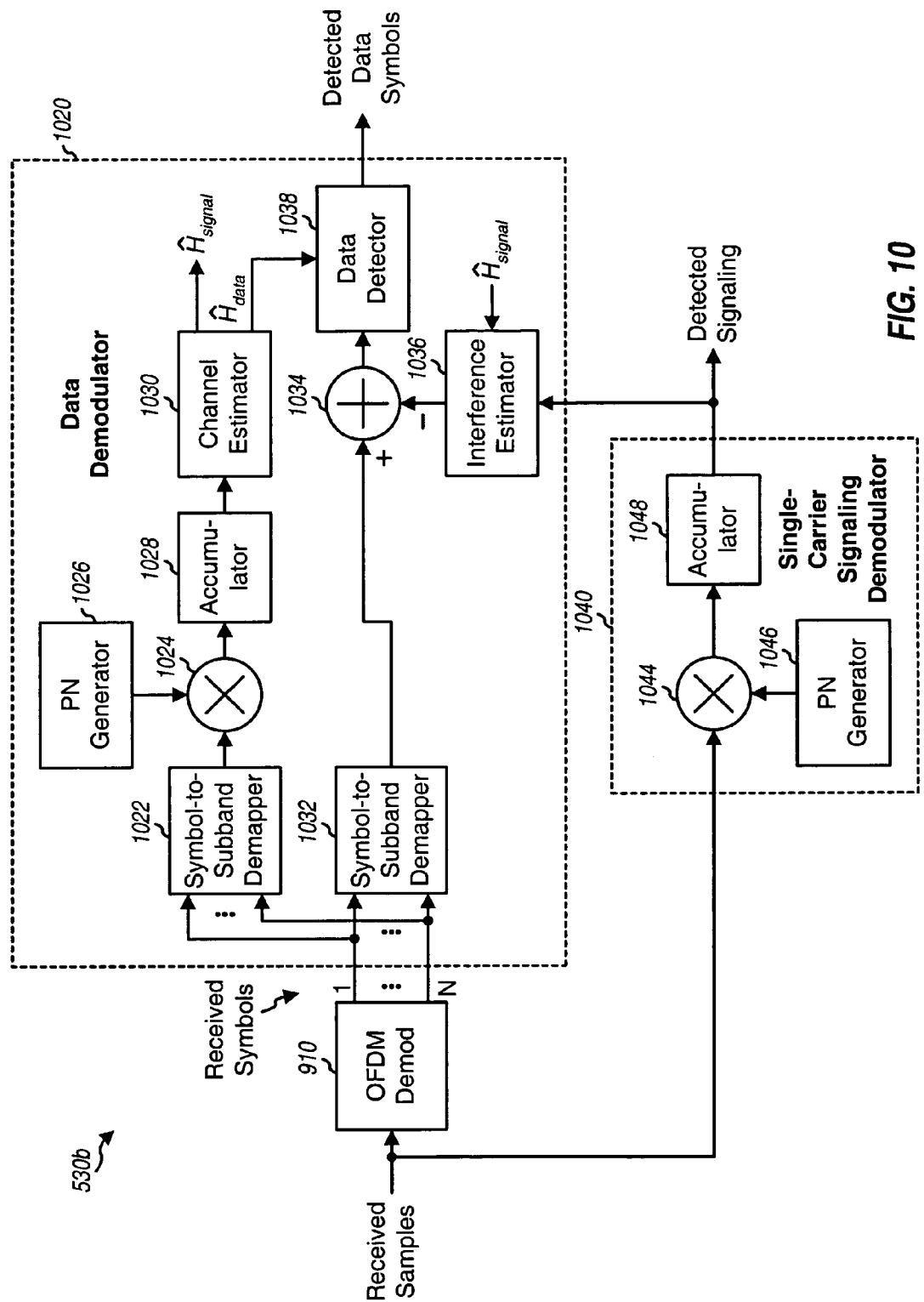
FIG. 10 shows a demodulator for the modulator in FIG. 7.

FIG. 10 shows a block diagram of a demodulator 530b, which may also be used for demodulator 530 or 560 in FIG. 5. Demodulator 530b performs processing complementary to the processing performed by modulator 570b in FIG. 7. Demodulator 530b includes OFDM demodulator 910, a data demodulator 1020, and a signaling demodulator 1040.

Within signaling demodulator 1040, a multiplier 1044 multiplies the data samples with the PN sequence used for signaling, which is generated by a PN generator 1046. An accumulator 1048 accumulates the output of multiplier 1044 over the length of the PN sequence and provides the detected signaling data.

Within data demodulator 1020, a symbol-to-subband demapper 1022 obtains the received symbols for all N total subbands from OFDM demodulator 910 and passes only the received pilot symbols for the subbands used for pilot transmission. A multiplier 1024 and an accumulator 1028 perform despreading on the received pilot symbols with the PN sequence used for the pilot, which is generated by a PN generator 1026. The pilot despreading is performed in a manner complementary to the pilot spreading. A channel estimator 1030 processes the despread pilot symbols and derives the $\hat{H}_{data}$ channel estimate for the subbands used for traffic data and the $\hat{H}_{signal}$ channel estimate for the subbands used for signaling.

A symbol-to-subband demapper 1032 also obtains the received symbols for all N total subbands and passes only the received data symbols for the subbands used for traffic data. An interference estimator 1036 estimates the interference due to the detected signaling and provides the interference estimate to a summer 1034, which subtracts the interference estimate from the received data symbols and provides the interference-canceled symbols. A data detector 1038 performs data detection on the interference-canceled symbols with the $\hat{H}_{data}$ channel estimate and provides the detected data symbols.

FIGS. 9 and 10 show two embodiments of a demodulator that may be used for the base station and terminal. Other designs may also be used for the demodulator, and this is within the scope of the invention. In general, the processing by the demodulator at one entity is determined by, and is complementary to, the processing by the modulator at the other entity.

Although not shown in FIGS. 9 and 10 for simplicity, the pilot may also be canceled if it is transmitted as underlay. For pilot cancellation, the pilot is reconstructed in either the time or frequency domain. For time-domain processing, an impulse response of the wireless channel is derived based on the received pilot symbols and circularly convolved with the output of an OFDM modulator whose input is the PN sequence used to spread the pilot symbols. The reconstructed pilot is then subtracted from the received samples to obtain pilot-canceled samples, which are provided to OFDM demodulator 910. For frequency-domain processing, the known pilot symbols are spread with the PN sequence and further multiplied with the channel gain estimates to generate reconstructed pilot symbols for different subbands and/or symbol periods. These reconstructed pilot symbols are then subtracted from the received symbols to obtain pilot-canceled symbols, which are provided to summer 934 or 1034.

The signaling transmission and reception techniques described herein may be implemented by various means. For example, these techniques may be implemented in hardware, software, or a combination thereof. For a hardware implementation, the processing units used for signaling transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for signaling reception may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 542 or 582 in FIG. 5) and executed by a processor (e.g., controller 540 or 580). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus in a wireless communication system utilizing orthogonal frequency division multiplexing (OFDM), comprising:

a signaling modulator that spreads signaling data over M frequency subbands used for signaling transmission, the M frequency subbands selected from among N frequency subbands usable for transmission, where M and N are each greater than one and M is less than or equal to N;

a data modulator that maps data symbols onto L frequency subbands used for data transmission, the L frequency subbands selected from among the N frequency subbands usable for transmission, where L is one or greater and is less than or equal to N; and a combiner that combines outputs of the signaling modulator and the data modulator;

wherein the M frequency subbands used for signaling transmission include at least a subset of the L frequency subbands used for data transmission.

2. The apparatus of claim 1, wherein the signaling modulator generates signaling chips for the spread signaling data, wherein the data modulator performs modulation on the mapped data symbols and generates data chips, and wherein the combiner combines the signaling chips with the data chips and generates output chips.

3. The apparatus of claim 1, further comprising:
an OFDM modulator that performs modulation on an output of the combiner and generates output chips.

4. The apparatus of claim 1, wherein M is equal to N and the signaling data is spread over all N usable frequency subbands.

5. The apparatus of claim 1, wherein M is less than N and the signaling data is spread over a subset of the N usable frequency subbands.

6. The apparatus of claim 1, wherein M is equal to L and the M frequency subbands are used for both signaling transmission and data transmission.

7. The apparatus of claim 1, wherein the signaling modulator spreads the signaling data for a wireless terminal with a pseudo-random number (PN) sequence assigned to the wireless terminal.

8. The apparatus of claim 1, wherein the signaling modulator multiplies the signaling data with a pseudo-random number (PN) sequence to generate signaling chips.

9. The apparatus of claim 1, wherein the signaling modulator multiplies the signaling data with a pseudo-random number (PN) sequence to generate spread signaling data and maps the spread signaling data onto the M frequency subbands.

10. The apparatus of claim 9, wherein the signaling modulator performs modulation on the mapped spread signaling data to generate signaling chips.

11. The apparatus of claim 2, wherein the combiner scales the signaling chips with a first gain, scales the data chips with a second gain, and sums the scaled signaling chips with the scaled data chips to generate the output chips.

12. The apparatus of claim 11, wherein the first gain is selected to achieve a target received signal quality for the signaling data at a receiving entity.

13. The apparatus of claim 1, wherein the signaling data is an acknowledgment (ACK) or a negative acknowledgment (NAK) for a data packet received by the apparatus.

14. The apparatus of claim 1, wherein the signaling data is a data rate control (DRC) value indicative of received signal quality at the apparatus.

15. The apparatus of claim 1, wherein the signaling data is a request for an estimate of received signal quality at an entity designated to receive the signaling data.

16. The apparatus of claim 1, wherein the signaling data is a request for air-link resources.

17. The apparatus of claim 1, wherein the signaling data is a power control (PC) command.

18. The apparatus of claim 2, wherein the data modulator multiplexes pilot symbols with the data symbols, maps the multiplexed pilot and data symbols onto the L frequency subbands, and performs modulation on the mapped pilot and data symbols to generate the data chips.

19. The apparatus of claim 18, wherein the data modulator time division multiplexes the pilot symbols with the data symbols, and wherein the pilot symbols and the data symbols are transmitted in different symbol periods.

20. The apparatus of claim 18, wherein the data modulator frequency division multiplexes the pilot symbols with the data symbols, and wherein the pilot symbols and the data symbols are transmitted on first and second non-overlapping subsets, respectively, of the L frequency subbands.

21. The apparatus of claim 1, further comprising:
a pilot modulator that spreads pilot symbols over P frequency subbands used for pilot transmission, the P frequency subbands being selected from among the N frequency subbands, where P is greater than one, and wherein the combiner combines outputs of the data modulator, the pilot modulator, and the signaling modulator.

22. The apparatus of claim 21, wherein the pilot modulator multiplies the pilot symbols with a pseudo-random number (PN) sequence to generate spread pilot symbols and maps the spread pilot symbols onto the P frequency subbands.

23. The apparatus of claim 21, wherein P is equal to L and the L frequency subbands are used for both pilot transmission and data transmission.

24. The apparatus of claim 1, wherein the wireless communication system is an orthogonal frequency division multiple access (OFDMA) system.

25. The apparatus of claim 1, wherein the wireless communication system utilizes frequency hopping, and wherein a different group of L frequency subbands is used for data transmission in each hop period.

26. A wireless terminal comprising the apparatus of claim 1.

27. A base station comprising the apparatus of claim 1.

28. A method of transmitting data and signaling in a wireless communication system utilizing orthogonal frequency division multiplexing (OFDM), comprising:
spreading signaling data over M frequency subbands used for signaling transmission, the M frequency subbands selected from among N frequency subbands usable for transmission, where M and N are each greater than one and M is less than or equal to N;
mapping data symbols onto L frequency subbands used for data transmission, the L frequency subbands selected from among the N frequency subbands usable for transmission, where L is one or greater and is less than or equal to N, and wherein the M frequency subbands used for signaling transmission include at least a subset of the L frequency subbands used for data transmission; and
processing the spread signaling data on the M frequency subbands and the mapped data symbols on the L frequency subbands to generate output chips.

29. The method of claim 28, wherein M is equal to N and the signaling data is spread over all N usable frequency subbands.

30. The method of claim 28, wherein the spreading the signaling data comprises multiplying the signaling data with a pseudo-random number (PN) sequence to generate signaling chips.

31. The method of claim 28, wherein the spreading the signaling data comprises
multiplying the signaling data with a pseudo-random number (PN) sequence to generate spread signaling data,
mapping the spread signaling data onto the M frequency subbands, and
performing modulation on the mapped and spread signaling data to generate signaling chips.

32. An apparatus in a wireless communication system utilizing orthogonal frequency division multiplexing (OFDM), comprising:
means for spreading signaling data over M frequency subbands used for signaling transmission, the M frequency subbands selected from among N frequency subbands usable for transmission, where M and N are each greater than one and M is less than or equal to N;
means for mapping data symbols onto L frequency subbands used for data transmission, the L frequency subbands selected from among the N frequency subbands usable for transmission, where L is one or greater and is less than or equal to N, and wherein the M frequency subbands used for signaling transmission include at least a subset of the L frequency subbands used for data transmission; and means for processing the spread signaling data on the M frequency subbands and the mapped data symbols on the L frequency subbands to generate output chips.

33. The apparatus of claim 32, wherein M is equal to N and the signaling data is spread over all N usable frequency subbands.

34. The apparatus of claim 32, wherein the means for spreading the signaling data comprises means for multiplying the signaling data with a pseudo-random number (PN) sequence to generate signaling chips.

35. The method of claim 32, wherein the means for spreading the signaling data comprises
means for multiplying the signaling data with a pseudo-random number (PN) sequence to generate spread signaling data,
means for mapping the spread signaling data onto the M frequency subbands, and
means for performing modulation on the mapped and spread signaling data to generate signaling chips.

36. An apparatus in a wireless communication system utilizing orthogonal frequency division multiplexing (OFDM), comprising:
an OFDM demodulator that performs demodulation on received samples and provides received symbols; and
a signaling demodulator that performs despreading on the received samples or received symbols for M frequency subbands used for signaling transmission and provides detected signaling data, wherein signaling data is spread across the M frequency subbands prior to transmission, and wherein the M frequency subbands are selected from among N frequency subbands usable for transmission, where M and N are each greater than one and M is less than or equal to N, wherein the M frequency subbands used for signaling transmission include at least a subset of L frequency subbands used for data transmission, where L is one or greater and is less than or equal to N.

37. The apparatus of claim 36, wherein M is equal to N and the signaling data is spread over all N usable frequency subbands.

38. The apparatus of claim 36, wherein the signaling demodulator multiplies the received samples with a pseudo-random number (PN) sequence and accumulates result of the multiplication to obtain the detected signaling data.

39. The apparatus of claim 36, wherein the signaling demodulator multiplies the received symbols for the M frequency subbands with a pseudo-random number (PN) sequence and accumulates result of the multiplication to obtain the detected signaling data.

40. The apparatus of claim 36, further comprising:
a data demodulator that performs data detection on received symbols for the L frequency subbands used for data transmission and provides detected data symbols.

41. The apparatus of claim 40, wherein the data demodulator derives a channel estimate for the L frequency subbands and performs data detection on the received symbols for the L frequency subbands with the channel estimate.

42. The apparatus of claim 40, wherein the data demodulator despreads received symbols for P frequency subbands used for pilot transmission, derives a channel estimate for the L frequency subbands based on despread symbols for the P frequency subbands, and performs data detection on the received symbols for the L frequency subbands with the channel estimate.

43. The apparatus of claim 40, wherein the data demodulator derives an interference estimate for the detected signaling data, subtracts the interference estimate from the received symbols for the L frequency subbands to obtain interference-canceled symbols, and performs data detection on the interference-canceled symbols to obtain the detected data symbols.

44. The apparatus of claim 40, wherein the data demodulator derives an interference estimate for pilot received by the apparatus, subtracts the interference estimate from the received symbols for the L frequency subbands to obtain pilot-canceled symbols, and performs data detection on the pilot-canceled symbols to obtain the detected data symbols.

45. A method of receiving data and signaling in a wireless communication system utilizing orthogonal frequency division multiplexing (OFDM), comprising:
performing demodulation on received samples to obtain received symbols; and
despreading the received samples or received symbols for M frequency subbands used for signaling transmission to obtain detected signaling data, wherein signaling data is spread across the M frequency subbands prior to transmission, and wherein the M frequency subbands are selected from among N frequency subbands usable for transmission, where M and N are each greater than one and M is less than or equal to N; and
performing data detection on received symbols for L frequency subbands used for data transmission to obtain detected data symbols, where L is one or greater and is less than or equal to N, and wherein the M frequency subbands include at least a subset of the L frequency subbands used for data transmission.

46. The method of claim 45, wherein M is equal to N and the signaling data is spread over all N usable frequency subbands.

47. The method of claim 45, wherein the despreading comprises
multiplying the received samples with a pseudo-random number (PN) sequence, and
accumulating result of the multiply to obtain the detected signaling data.

48. The method of claim 45, wherein the despreading comprises
multiplying the received symbols for the M frequency subbands with a pseudo-random number (PN) sequence, and
accumulating result of the multiply to obtain the detected signaling data.

49. An apparatus in a wireless communication system utilizing orthogonal frequency division multiplexing (OFDM), comprising:
means for performing demodulation on received samples to obtain received symbols; and
means for despreading the received samples or received symbols for M frequency subbands used for signaling transmission to obtain detected signaling data, wherein signaling data is spread across the M frequency subbands prior to transmission, and wherein the M frequency subbands are selected from among N frequency subbands usable for transmission, where M and N are each greater than one and M is less than or equal to N; and
means for performing data detection on received symbols for L frequency subbands used for data transmission to obtain detected data symbols, where L is one or greater and is less than or equal to N, and wherein the M frequency subbands used for signaling transmission include at least a subset of the L frequency subbands used for data transmission.

50. The apparatus of claim 49, wherein M is equal to N and the signaling data is spread over all N usable frequency subbands.

51. The apparatus of claim 49, wherein the means for despreading comprises means for multiplying the received samples with a pseudo-random number (PN) sequence, and means for accumulating result of the multiply to obtain the detected signaling data.

52. The apparatus of claim 49, wherein the means for despreading comprises means for multiplying the received symbols for the M frequency subbands with a pseudo-random number (PN) sequence, and means for accumulating result of the multiply to obtain the detected signaling data.

* * * * *